(12) United States Patent
Iida et al.

(10) Patent No.: US 8,855,331 B2
(45) Date of Patent: Oct. 7, 2014

(54) AUDIO ANALYSIS APPARATUS

(75) Inventors: Kiyoshi Iida, Kanagawa (JP); Haruo Harada, Kanagawa (JP); Hirohito Yoneyama, Kanagawa (JP); Kei Shimotani, Kanagawa (JP); Yohei Nishino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 417 days.

(21) Appl. No.: 13/406,225

(22) Filed: Feb. 27, 2012

(65) Prior Publication Data

US 2013/0080168 A1 Mar. 28, 2013

(30) Foreign Application Priority Data

Sep. 27, 2011 (JP) ................................. 2011-211476

(51) Int. Cl.

| H04R 3/00 | (2006.01) |
|---|---|
| H04R 1/02 | (2006.01) |
| H04R 9/08 | (2006.01) |
| G10L 25/51 | (2013.01) |
| G10L 25/78 | (2013.01) |
| H04R 5/027 | (2006.01) |
| G10L 17/00 | (2013.01) |

(52) U.S. Cl.
CPC ............. *G10L 25/51* (2013.01); *G10L 25/78* (2013.01); *H04R 5/027* (2013.01); *G10L 17/00* (2013.01); *H04R 3/005* (2013.01); *H04R 2420/07* (2013.01)
USPC .................. 381/92; 381/91; 381/364

(58) Field of Classification Search
CPC ........ G01L 25/51; G01L 25/87; G01S 3/8083
USPC ............ 381/92, 91, 364, 122, 77, 79, 80, 26, 381/360, 85, 82
See application file for complete search history.

(56) References Cited

U.S. PATENT DOCUMENTS

| 5,778,082 A * | 7/1998 | Chu et al. ..................... 381/92 |
| 8,019,386 B2 * | 9/2011 | Dunn et al. ................... 455/563 |
| 8,031,881 B2 * | 10/2011 | Zhang ............................ 381/92 |
| 8,155,345 B2 * | 4/2012 | Tagawa et al. ................ 381/92 |
| 8,442,833 B2 * | 5/2013 | Chen ............................ 704/270 |

FOREIGN PATENT DOCUMENTS

| JP | 08-191496 A | 7/1996 |
| JP | 2009-109868 A | 5/2009 |

* cited by examiner

*Primary Examiner* — Vivian Chin
*Assistant Examiner* — David Ton
(74) *Attorney, Agent, or Firm* — Sughrue Mion, PLLC

(57) ABSTRACT

An audio analysis apparatus includes the following components. A strap has an end portion connected to a main body and is used to hang the main body from a user's neck. A first audio acquisition device is at the end portion or in the main body. Second and third audio acquisition devices are at positions separate from the end portion by substantially the same predetermined distances, on the respective sides of the strap extending from the user's neck. An analysis unit discriminates whether an acquired sound is an uttered voice of the user or another person by comparing audio signals of acquired by the first and second or third audio acquisition devices and detects an orientation of the user's face by comparing the audio signals acquired by the second and third audio acquisition devices. A transmission unit transmits the analysis result to an external apparatus.

9 Claims, 12 Drawing Sheets

FIG. 1
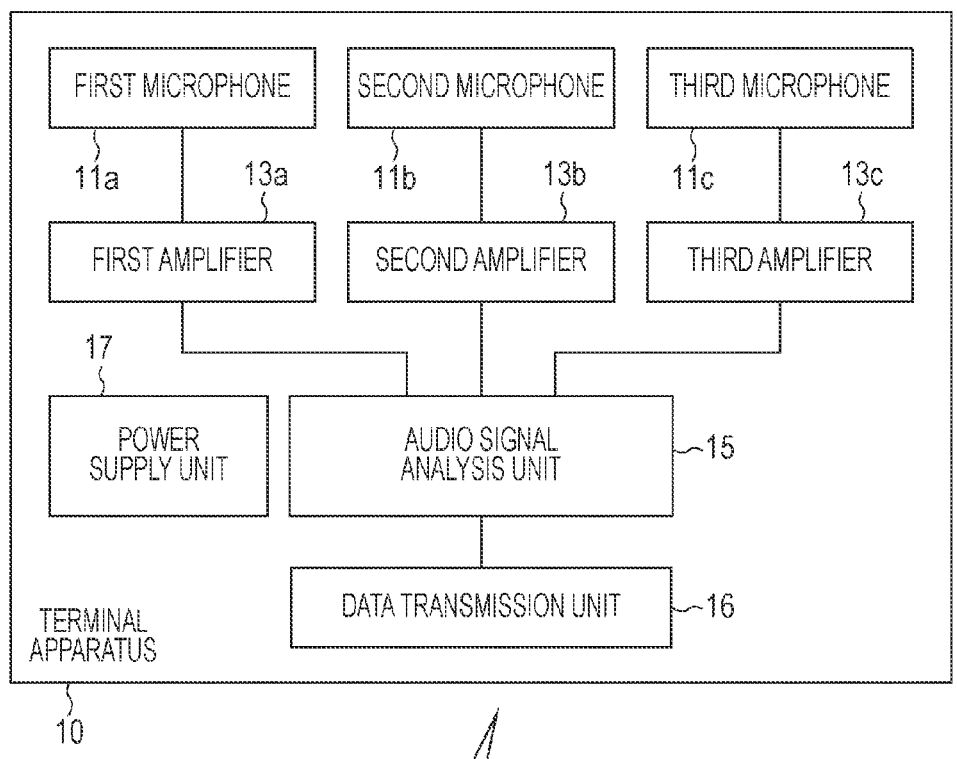
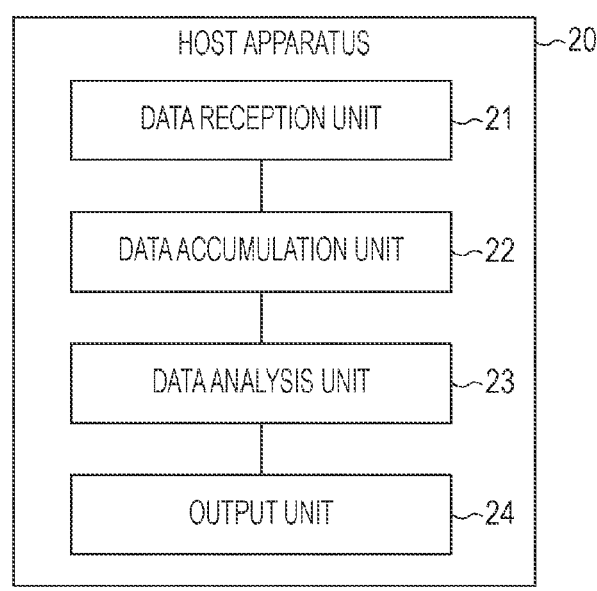

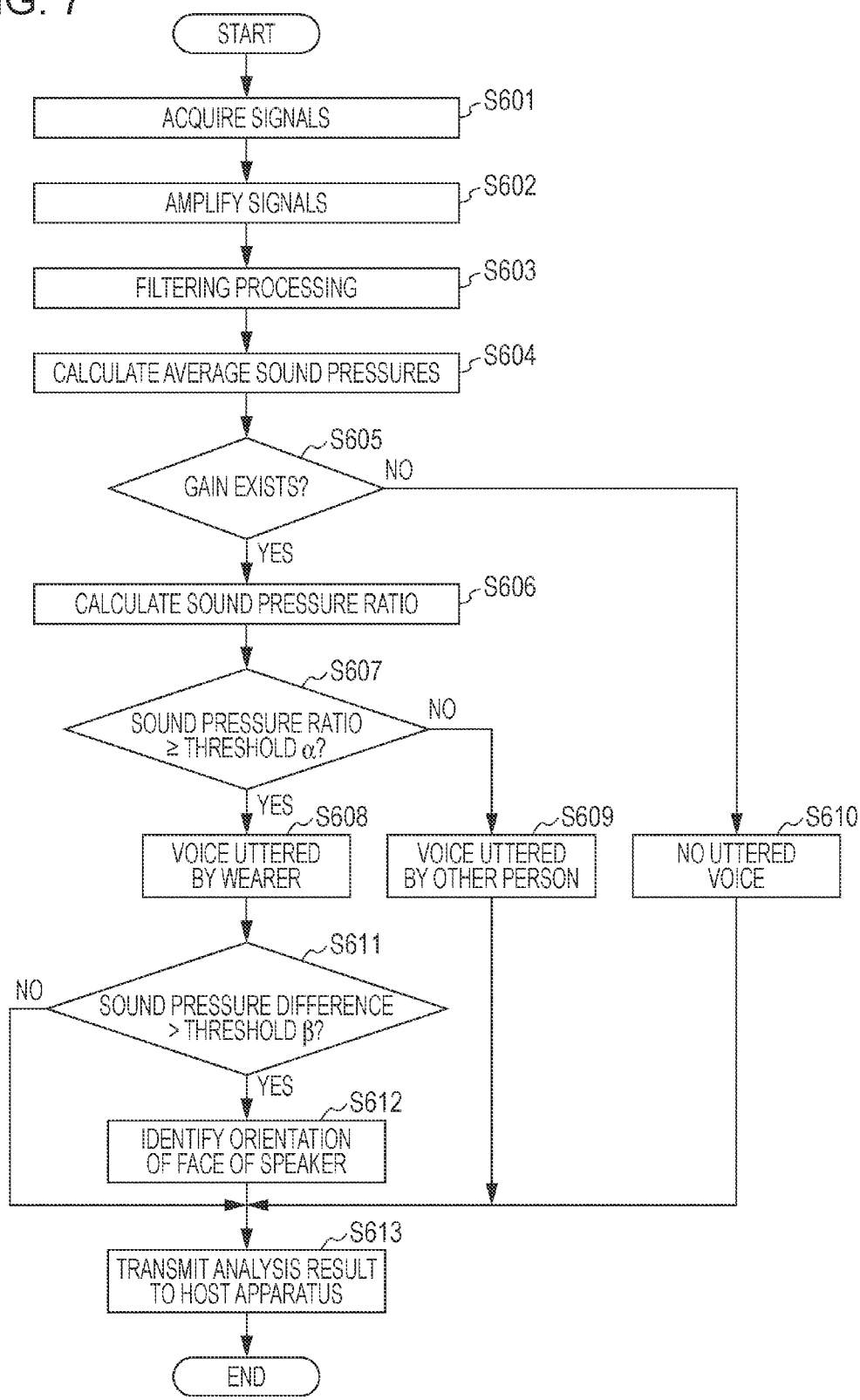

AUDIO ANALYSIS APPARATUS

CROSS-REFERENCE TO RELATED APPLICATIONS

This application is based on and claims priority under 35 USC 119 from Japanese Patent Application No. 2011-211476 filed Sep. 27, 2011.

BACKGROUND

Technical Field

The present invention relates to audio analysis apparatuses.

SUMMARY

According to an aspect of the invention, there is provided an audio analysis apparatus including a main body, a strap, first to third audio acquisition devices, an analysis unit, and a transmission unit. The strap has an end portion to be connected to the main body and is to be used in order to hang the main body from the neck of a user. The first audio acquisition device is at the end portion of the strap or in the main body. The second audio acquisition device is at a position which is separate from the end portion by a first predetermined distance and which is on one side of the strap that extends from the neck of the user. The third audio acquisition device is at another position which is separate from the end portion by a second predetermined distance and which is on the other side of the strap that extends from the neck of the user. The second predetermined distance is substantially equal to the first predetermined distance. The analysis unit is in the main body, and performs an analysis process to discriminate whether a sound acquired by the first audio acquisition device and the second or third audio acquisition device is an uttered voice of the user who is wearing the strap around the neck or an uttered voice of another person on the basis of a result of comparing a first audio signal of the sound acquired by the first audio acquisition device with a second audio signal of the sound acquired by the second audio acquisition device or a third audio signal of the sound acquired by the third audio acquisition device, and to detect an orientation of the face of the user who is wearing the strap around the neck on the basis of a result of comparing the second audio signal with the third audio signal. The transmission unit is in the main body and transmits an analysis result obtained by the analysis unit to an external apparatus.

BRIEF DESCRIPTION OF THE DRAWINGS

Exemplary embodiment(s) of the present invention will be described in detail based on the following figures, wherein:

FIG. 1 illustrates an example of a configuration of an audio analysis system according to an exemplary embodiment;

FIG. 7 is a flowchart illustrating an operation of the terminal apparatus in the exemplary embodiment;

DETAILED DESCRIPTION

Figure 2:
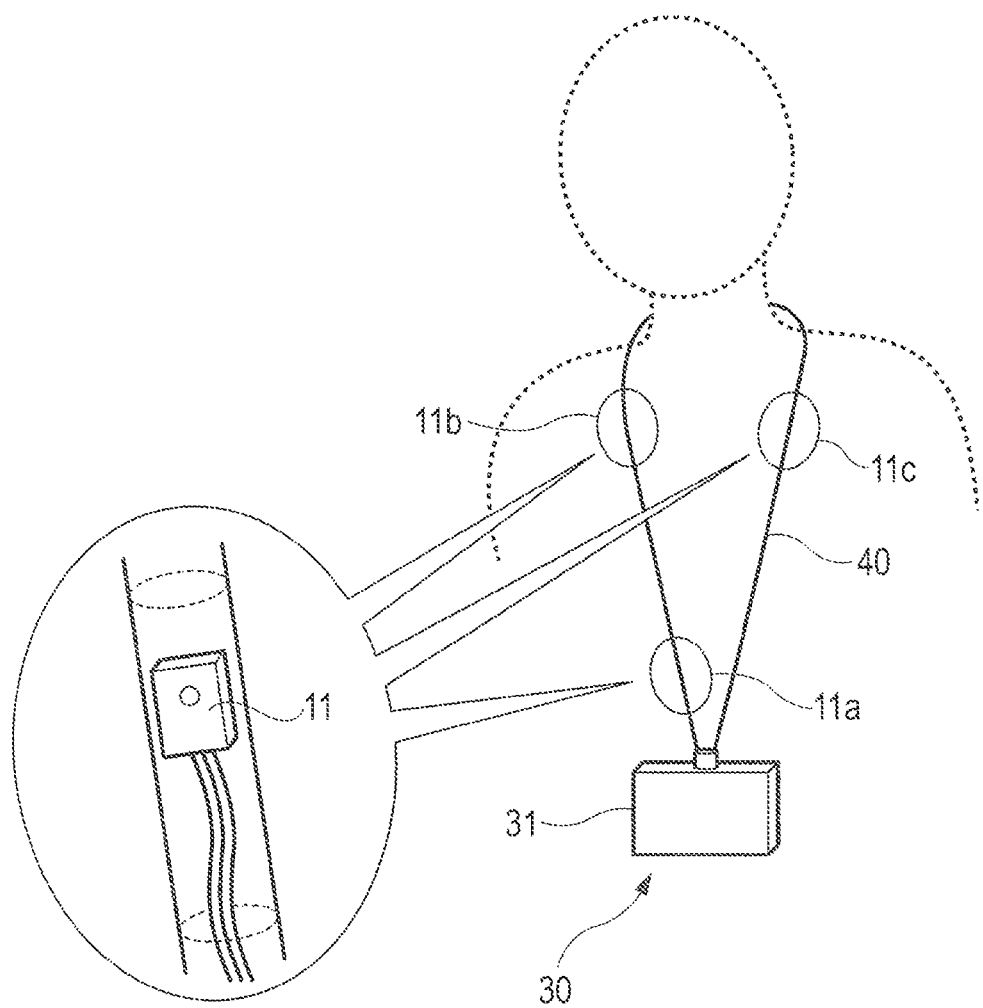
FIG. 2 illustrates an example of a configuration of a terminal apparatus in the exemplary embodiment.

An exemplary embodiment of the present invention will be described in detail below with reference to the accompanying drawings.

FIG. 1 illustrates an example of a configuration of an audio analysis system according to an exemplary embodiment.

As illustrated in FIG. 1, the audio analysis system according to this exemplary embodiment includes a terminal apparatus 10 and a host apparatus 20. The terminal apparatus 10 is connected to the host apparatus 20 via a wireless communication network. As the wireless communication network, any network based on an existing scheme, such as wireless fidelity (Wi-Fi (trademark)), Bluetooth (trademark), ZigBee (trademark), or ultra wideband (UWB), may be used. Although one terminal apparatus 10 is illustrated in the example, as many terminal apparatuses 10 as the number of users are actually prepared because the terminal apparatus 10 is worn and used by each user, as described in detail later. Hereinafter, a user wearing the terminal apparatus 10 is referred to as a wearer.

The terminal apparatus 10 includes at least three microphones (e.g., a first microphone 11a, a second microphone 11b, and a third microphone 11c) serving as audio acquisition devices, and amplifiers (e.g., a first amplifier 13a, a second amplifier 13b, and a third amplifier 13c). The terminal apparatus 10 also includes, as a processor, an audio signal analysis unit 15 that analyzes recorded audio signals and a data transmission unit 16 that transmits an analysis result to the host apparatus 20. The terminal apparatus 10 further includes a power supply unit 17.

The first microphone 11a, the second microphone 11b, and the third microphone 11c are arranged at positions where distances of sound wave propagation paths (hereinafter, simply referred to as "distances") from the mouth (voice emitting portion) of a wearer are individually set. It is assumed here that the first microphone 11a is arranged at a farther position (e.g., approximately 35 centimeters apart) from the mouth of the wearer, whereas the second and third microphones 11b and 11c, respectively, are arranged at nearer positions (e.g., approximately 10 centimeters apart) from the mouth of the wearer. Additionally, the second microphone 11b and the third microphone 11c are arranged on the right side and the left side of the mouth of the wearer, respectively, so as to be located substantially symmetrically about the vertical line that passes through the mouth of the wearer in a state where the wearer is facing the front. Microphones of various existing types, such as dynamic microphones or condenser microphones, may be used as the first microphone 11a, the second microphone 11b, and the third microphone 11c in this exemplary embodiment. Particularly, non-directional micro electro mechanical system (MEMS) microphones are desirably used.

The first amplifier 13a, the second amplifier 13b, and the third amplifier 13c amplify electric signals (audio signals) that are output by the first microphone 11a, the second microphone 11b, and the third microphone 11c in accordance with the acquired sound, respectively. Existing operational amplifiers or the like may be used as the first amplifier 13a, the second amplifier 13b, and the third amplifier 13c in this exemplary embodiment.

The audio signal analysis unit 15 analyzes the audio signals output from the first amplifier 13a, the second amplifier 13b, and the third amplifier 13c. The audio signal analysis unit 15 discriminates whether the sound acquired by the first microphone 11a, the second microphone 11b, and the third microphone 11c is a voice uttered by the wearer who is wearing the terminal apparatus 10 or a voice uttered by another person. That is, the audio signal analysis unit 15 functions as a discriminator that discriminates a speaker of the voice on the basis of the sound acquired by the first microphone 11a, the second microphone 11b, and the third microphone 11c. Concrete content of a speaker discrimination process will be described later.

Upon determining that the speaker of the voice is the wearer, the audio signal analysis unit 15 further analyzes the audio signals output from the second amplifier 13b and the third amplifier 13c, and determines whether the mouth of the wearer is directed toward the side where the second microphone 11b is arranged or the side where the third microphone 11c is arranged. That is, the audio signal analysis unit 15 functions as a detector that detects a posture (orientation of the face) of the wearer on the basis of the sound acquired by the second microphone 11b and the third microphone 11c. Concrete content of a posture detection process will be described later.

The data transmission unit 16 transmits the identification (ID) of the terminal apparatus 10 and obtained data including an analysis result obtained by the audio signal analysis unit 15, to the host apparatus 20 via the wireless communication network. Depending on content of the process performed in the host apparatus 20, the information to be transmitted to the host apparatus 20 may include information, such as acquisition times at which a sound is acquired by the first microphone 11a, the second microphone 11b, and the third microphone 11c, and sound pressures of the acquired sound in addition to the analysis result. Additionally, the terminal apparatus 10 may include a data accumulation unit that accumulates analysis results obtained by the audio signal analysis unit 15. The data accumulated over a predetermined period may be collectively transmitted. Also, the data may be transmitted via a wired network.

The power supply unit 17 supplies electric power to the first microphone 11a, the second microphone 11b, the third microphone 11c, the first amplifier 13a, the second amplifier 13b, the third amplifier 13c, the audio signal analysis unit 15, and the data transmission unit 16. As the power supply, an existing power supply, such as a battery or rechargeable battery, may be used. The power supply unit 17 may also include known circuits, such as a voltage conversion circuit and a charge control circuit.

The host apparatus 20 includes a data reception unit 21 that receives data transmitted from the terminal apparatus 10, a data accumulation unit 22 that accumulates the received data, a data analysis unit 23 that analyzes the accumulated data, and an output unit 24 that outputs an analysis result. The host apparatus 20 is implemented by an information processing apparatus, e.g., a personal computer. Additionally, as described above, the plural terminal apparatuses 10 are used in this exemplary embodiment, and the host apparatus 20 receives data from each of the plural terminal apparatuses 10.

The data reception unit 21 is compatible with the wireless communication network. The data reception unit 21 receives data from each terminal apparatus 10, and sends the received data to the data accumulation unit 22. The data accumulation unit 22 is implemented by a storage device, e.g., a magnetic disk device of the personal computer. The data accumulation unit 22 accumulates, for each speaker, the received data acquired from the data reception unit 21. Here, a speaker is identified by comparing the terminal ID transmitted from the terminal apparatus 10 with a terminal ID that is pre-registered in the host apparatus 20 in association with a speaker name. Alternatively, a wearer name may be transmitted from the terminal apparatus 10 instead of the terminal ID.

The data analysis unit 23 is implemented by, for example, a central processing unit (CPU) of the personal computer which is controlled on the basis of programs. The data analysis unit 23 analyzes the data accumulated in the data accumulation unit 22. Various contents and methods of analysis are adoptable as concrete contents and methods of the analysis in accordance with the usage and application of the audio analysis system according to this exemplary embodiment. For example, the frequency of conversions carried out between wearers of the terminal apparatuses 10 and a tendency of a conversation partner of each wearer are analyzed or a relationship between partners of a conversation is estimated from information on durations and sound pressures of utterances made by corresponding speakers in the conversation.

The output unit 24 outputs an analysis result obtained by the data analysis unit 23 and data based on the analysis result. Various output methods, such as displaying with a display, printing with a printer, and outputting a sound, may be adoptable in accordance with the usage and application of the audio analysis system and the content and format of the analysis result.

FIG. 2 illustrates an example of a configuration of the terminal apparatus 10.

As described above, the terminal apparatus 10 is worn and used by each user. In order to permit a user to wear the terminal apparatus 10, the terminal apparatus 10 according to this exemplary embodiment includes a main body 30 and a strap 40 that is connected to the main body 30, as illustrated in FIG. 2. In the illustrated configuration, a user wears the strap 40 around their neck to hang the main body 30 from their neck.

The main body 30 includes a thin rectangular parallelepiped casing 31, which is formed of metal, resin, or the like and which contains at least circuits implementing the first amplifier 13a, the second amplifier 13b, the third amplifier 13c, the audio signal analysis unit 15, the data transmission unit 16, and the power supply unit 17, and a power supply (battery) of the power supply unit 17. The casing 31 may have a pocket into which an ID card displaying ID information, such as the name and the section of the wearer, is to be inserted. Additionally, such ID information may be printed on the casing 31 or a sticker having the ID information written thereon may be adhered onto the casing 31.

The strap 40 includes the first microphone 11a, the second microphone 11b, and the third microphone 11c (hereinafter, the first to third microphones 11a to 11c are referred to as microphones 11 when distinction is not needed). The microphones 11 are connected to the corresponding first, second, and third amplifiers 13a, 13b, and 13c contained in the main body 30 via cables (wirings or the like) extending inside the strap 40. Various existing materials, such as leather, synthetic leather, natural fibers such as cotton, synthetic fibers made of resins or the like, and metal, may be used as the material of the strap 40. The strap 40 may also be coated with silicone resins, fluorocarbon resins, etc.

The strap 40 has a tubular structure and contains the microphones 11 therein. By disposing the microphones 11 inside the strap 40, damages and stains of the microphones 11 are avoided and conversation participants become less conscious of the presence of the microphones 11. Meanwhile, the first microphone 11a which is arranged at a farther position from the mouth of a wearer may be disposed in the main body 30, i.e., inside the casing 31. In this exemplary embodiment, however, the description will be given for an example case where the first microphone 11a is disposed in the strap 40.

Referring to FIG. 2, the first microphone 11a is disposed at an end portion of the strap 40 to be connected to the main body 30 (e.g., at a position within 10 centimeters from a connection part). In this way, the first microphone 11a is arranged at a position separate from the mouth of the wearer by approximately 30 to 40 centimeters in a state where the wearer wears the strap 40 around their neck to hang the main body 30 from their neck. When the first microphone 11a is disposed in the main body 30, the distance between the mouth of the wearer and the first microphone 11a is substantially the same.

The second microphone 11b and the third microphone 11c are disposed at positions away from the end portion of the strap 40 connected to the main body 30 (e.g., positions that are separate from the connection part by approximately 20 to 30 centimeters). In this way, the second microphone 11b and the third microphone 11c are located near the neck (e.g., positions of the collarbones) and are arranged at positions that are separate from the mouth of the wearer by appropriately 10 to 20 centimeters, in a state where the wearer wears the strap 40 around their neck to hang the main body 30 from their neck. Since the second microphone 11b and the third microphone 11c are arranged on the right side and the left side of the neck of the wearer in this state, respectively, the second microphone 11b and the third microphone 11c are located substantially symmetrically about the vertical line that passes through the mouth of the wearer in the state where the wearer is facing the front.

The configuration of the terminal apparatus 10 according to this exemplary embodiment is not limited to the one illustrated in FIG. 2. For example, a positional relationship among the first microphone 11a to the third microphone 11c is specified so that at least a condition is satisfied that the distance between the first microphone 11a and the mouth of the wearer is several times as large as the distance between the second microphone 11b and the mouth of the wearer and the distance between the third microphone 11c and the mouth of the wearer. Accordingly, the first microphone 11a may be provided in the strap 40 to be located behind the neck. Additionally, the microphones 11 are not necessarily disposed in the strap 40. The wearer may wear the microphones 11 using various tools. For example, each of the first microphone 11a to the third microphone 11c may be separately fixed to the clothes with a pin or the like. Additionally, a dedicated wear may be prepared and worn which is designed so that the first microphone 11a to the third microphone 11c are fixed at desired positions.

Additionally, the configuration of the main body 30 is not limited to the one illustrated in FIG. 2 in which the main body 30 is connected to the strap 40 and is hung from the neck of the wearer. The main body 30 is desirably configured as an easy-to-carry apparatus. For example, unlike this exemplary embodiment, the main body 30 may be attached to the clothes or body with clips or belts instead of the strap 40 or may be simply stored in a pocket and carried. Furthermore, a function for receiving audio signals from the microphones 11, amplifying and analyzing the audio signals may be implemented in existing mobile electronic information terminals, such as mobile phones. When the first microphone 11a is disposed in the main body 30, the position of the main body 30 is specified when being carried because the positional relationship among the first microphone 11a, the second microphone 11b, and the third microphone 11c has to be held as described above.

Moreover, the microphones 11 may be connected to the main body 30 (or the audio signal analysis unit 15) via wireless communication instead of using cables. Although the first amplifier 13a, the second amplifier 13b, the third amplifier 13c, the audio signal analysis unit 15, the data transmission unit 16, and the power supply unit 17 are contained in a single casing 31 in the above configuration example, these units may be configured as plural independent devices. For example, the power supply unit 17 may be removed from the casing 31, and the terminal apparatus 10 may be connected to an external power supply and used.

Speakers (a wearer and another person) are discriminated on the basis of nonverbal information of a recorded sound. The speaker discrimination method according to this exemplary embodiment will be described next.

The audio analysis system according to this exemplary embodiment discriminates between an uttered voice of a wearer of the terminal apparatus 10 and an uttered voice of another person, using information of a sound recorded by the first microphone 11a and information of the sound recorded by the second microphone 11b or the third microphone 11c among the three microphones 11 included in the terminal apparatus 10. That is, in this exemplary embodiment, the wearer or the other person is discriminated regarding a speaker of the recorded voice. Additionally, in this exemplary embodiment, speakers are discriminated on the basis of nonverbal information of the recorded sound, such as sound pressures (sound volumes input to the microphones 11), instead of verbal information obtained by using morphological analysis and dictionary information. That is, speakers of voices are discriminated on the basis of an utterance state identified from nonverbal information, instead of utterance content identified from verbal information. Meanwhile, the information of the sound recorded by the first microphone 11a and one of the information of the sound recorded by the second microphone 11b and the information of the sound recorded by the third microphone 11c are used in the speaker discrimination process according to this exemplary embodiment. However, it is assumed that the information of the sound recorded by the second microphone 11b is used in the following description.

As described with reference to FIGS. 1 and 2, the first microphone 11a of the terminal apparatus 10 is arranged at a farther position from the mouth of the wearer, whereas the second microphone 11b is arranged at a nearer position from the mouth of the wearer in this exemplary embodiment. When the mouth of the wearer is assumed as a sound source, the distance between the first microphone 11a and the sound source greatly differs from the distance between the second microphone 11b and the sound source. Specifically, the distance between the first microphone 11a and the sound source is approximately one-and-half to four times as large as the distance between the second microphone 11b and the sound source. Meanwhile, a sound pressure of a sound recorded by the microphone 11 attenuates (space attenuation) in proportion to the distance between the microphone 11 and the sound source. Accordingly, regarding an uttered voice of the wearer, a sound pressure of the sound recorded by the first microphone 11 greatly differs from a sound pressure of the sound recorded by the second microphone 11b.

On the other hand, when the mouth of a non-wearer (another person) is assumed as a sound source, the distance between the first microphone 11a and the sound source does not greatly differ from the distance between the second microphone 11b and the sound source because the other person is apart from the wearer. Although the distances may differ depending on the position of the other person against the wearer, the distance between the first microphone 11a and the sound source does not become several times as large as the distance between the second microphone 11b and the sound source, unlike the case where the mouth of the wearer is assumed as the sound source. Accordingly, regarding an uttered voice of the other person, the sound pressure of the sound recorded by the first microphone 11a does not greatly differ from the sound pressure of the sound recorded by the second microphone 11b, unlike the uttered voice of the wearer.

Figure 3:
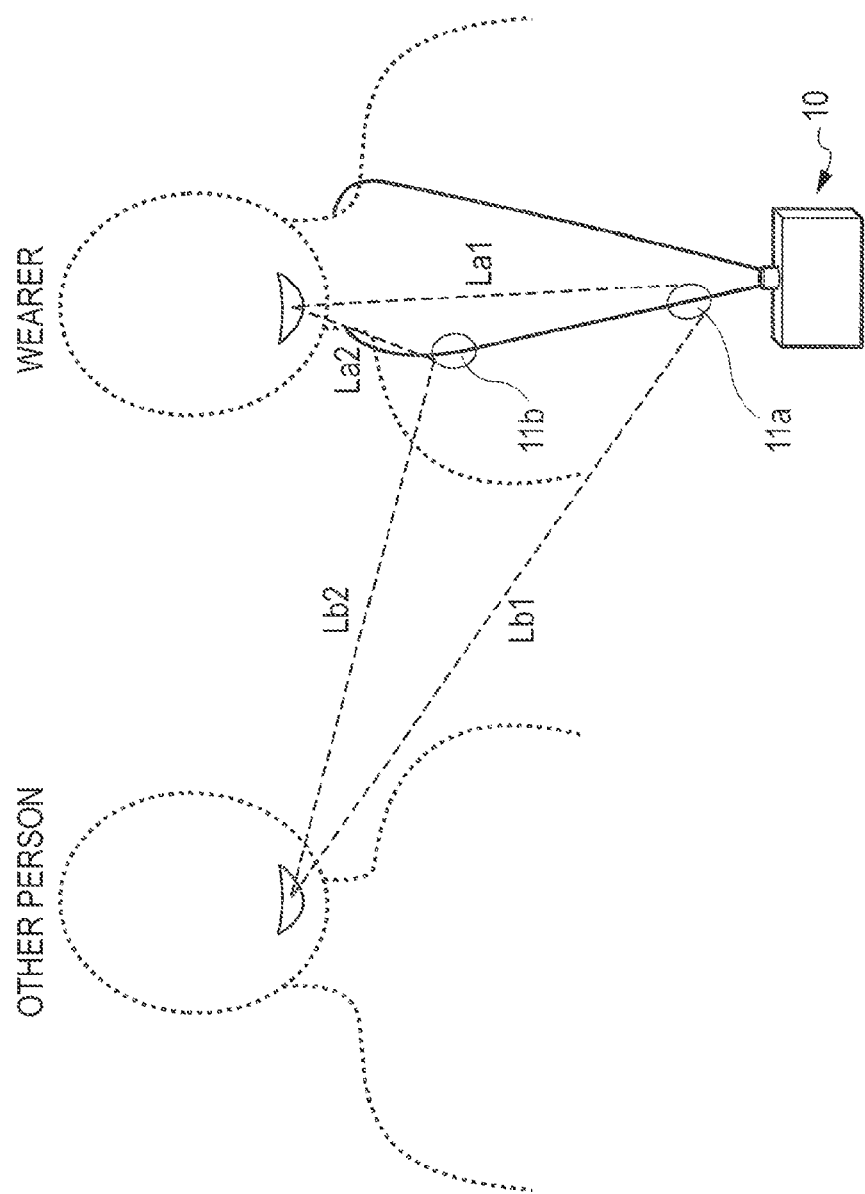
FIG. 3 illustrates positional relationships between microphones and mouths (voice emitting portions) of a wearer and another person.

FIG. 3 illustrates positional relationships between mouths of the wearer and the other person and the microphones 11.

In the relationships illustrated in FIG. 3, a distance between a sound source "a", i.e., the mouth of the wearer, and the first microphone 11a and a distance between the sound source "a" and the second microphone 11b are denoted as "La1" and "La2", respectively. Additionally, a distance between a sound source "b", i.e., the mouth of the other person, and the first microphone 11a and a distance between the sound source "b" and the second microphone 11b are denoted as "Lb1" and "Lb2", respectively. In this case, the following relations are satisfied.

$$La1 > La2 (La1 \approx 1.5 \times La2 \text{ to } 4 \times La2)$$

$$Lb1 \approx La2$$

Figure 4:
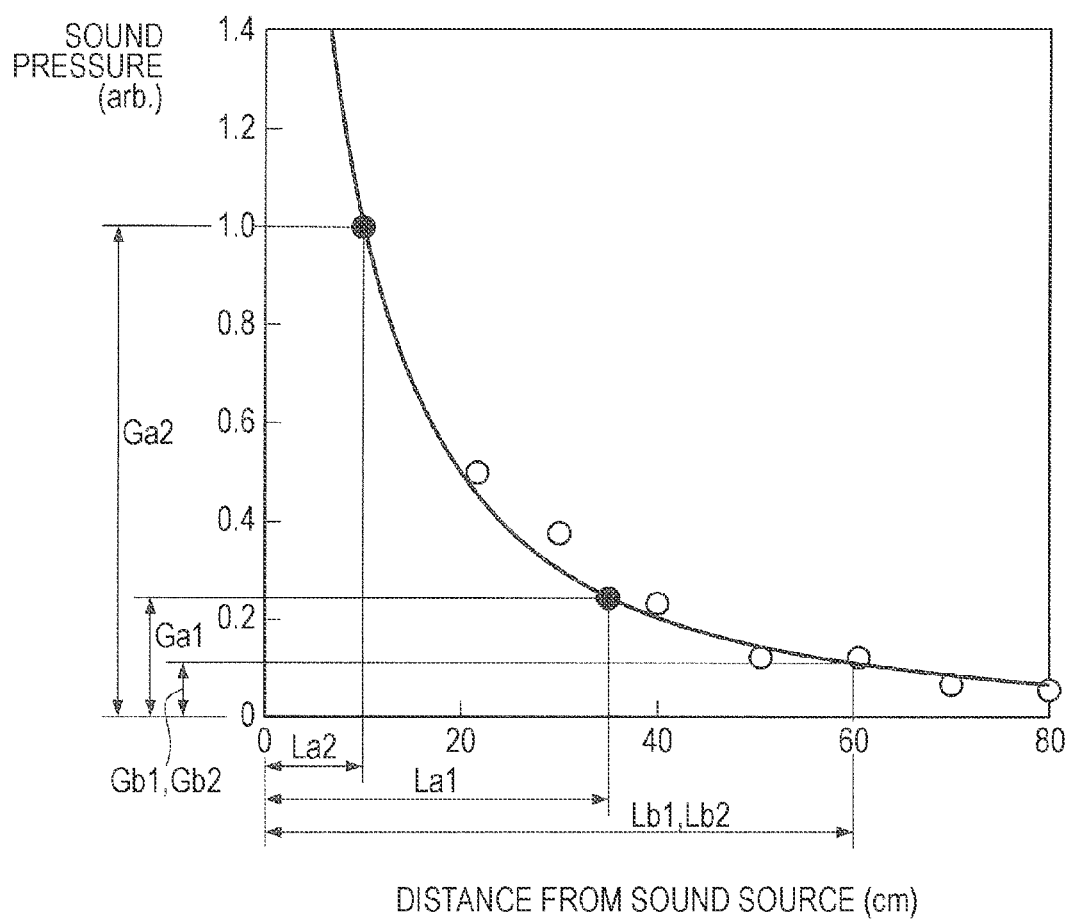
FIG. 4 illustrates a relationship between a sound pressure (input sound volume) and a distance of a sound wave propagation path between a microphone and a sound source.

FIG. 4 illustrates a relationship between a sound pressure (input sound volume) and a distance between the sound source and the microphone 11.

As described above, sound pressures attenuate depending on the distances between the sound source and the microphones 11. In FIG. 4, when a sound pressure Ga1 corresponding to the distance La1 is compared with a sound pressure Ga2 corresponding to the distance La2, the sound pressure Ga2 is approximately four times as large as the sound pressure Ga1. On the other hand, a sound pressure Gb1 corresponding to the distance Lb1 is substantially equal to a sound pressure Gb2 corresponding to the distance Lb2 because the distance Lb1 is substantially equal to the distance Lb2. Accordingly, in this exemplary embodiment, an uttered voice of the wearer and an uttered voice of the other person contained in the recorded sound are discriminated by using a difference in the sound pressure ratio. Although the distances Lb1 and Lb2 are set substantially equal to 60 centimeters in the example illustrated in FIG. 4, the distances Lb1 and Lb2 are not limited to the illustrated values since the fact that the sound pressure Gb1 is substantially equal to the sound pressure Gb2 has the meaning.

Figure 5:
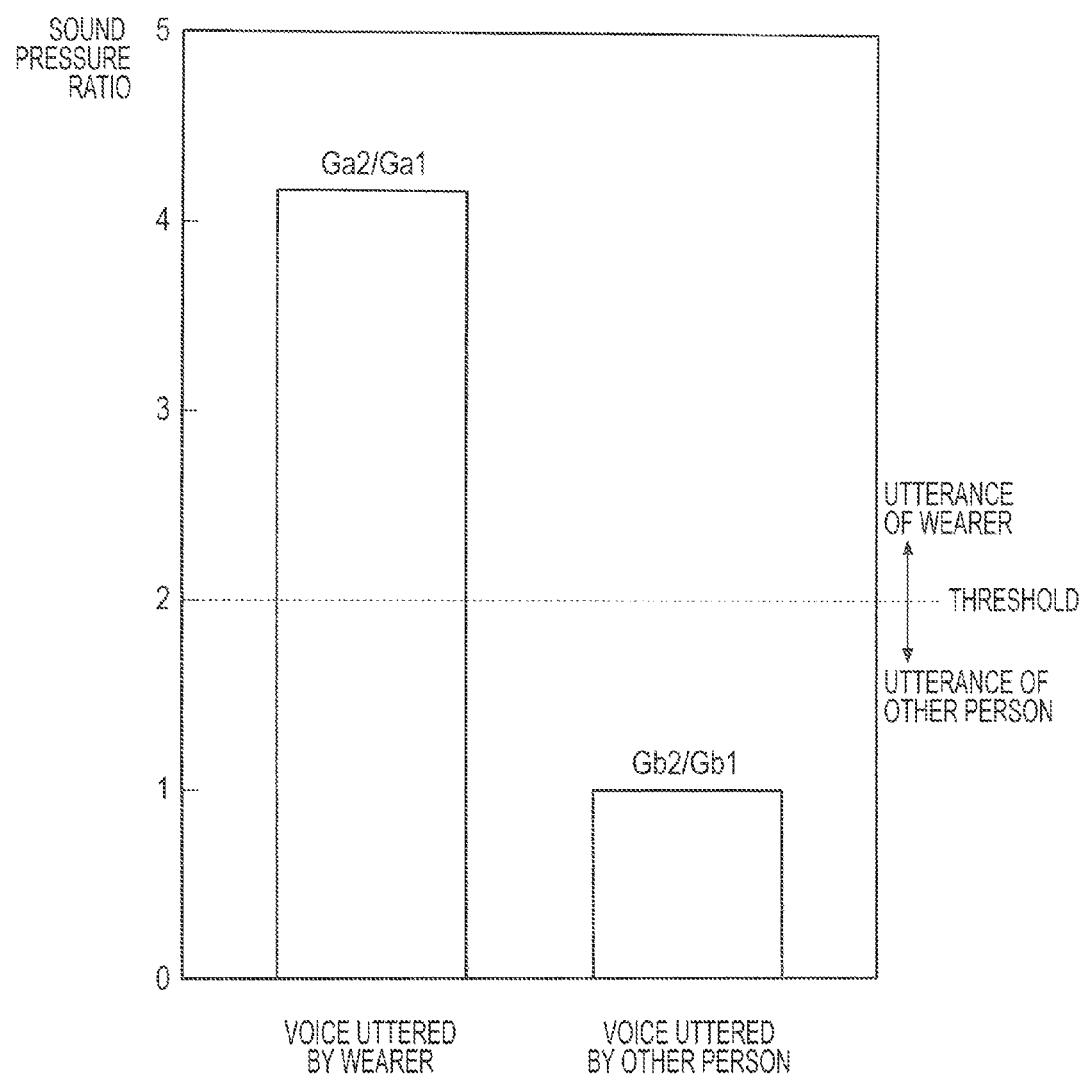
FIG. 5 illustrates a method for discriminating between an uttered voice of a wearer and an uttered voice of another person.

FIG. 5 illustrates a method for discriminating between a voice uttered by the wearer and a voice uttered by the other person.

As described with reference to FIG. 4, regarding the voice uttered by the wearer, the sound pressure Ga2 at the second microphone 11b is several times (e.g., four times) as large as the sound pressure Ga1 at the first microphone 11a. Additionally, regarding the voice uttered by the other person, the sound pressure Gb2 at the second microphone 11b is substantially equal to (approximately as large as) the sound pressure Gb1 at the first microphone 11a. Accordingly, in this exemplary embodiment, a threshold α is set for a ratio of the sound pressure at the second microphone 11b to the sound pressure at the first microphone 11a. If the sound pressure ratio is greater than or equal to the threshold α, it is determined that the voice is uttered by the wearer. If the sound pressure ratio is smaller than the threshold α, it is determined that the voice is uttered by the other person. In the example illustrated in FIG. 5, the threshold α is set equal to "2". Since a sound pressure ratio Ga2/Ga1 exceeds the threshold α="2", it is determined that the voice is uttered by the wearer. Similarly, since a sound pressure ratio Gb2/Gb1 is smaller than the threshold α="2", it is determined that the voice is uttered by the other person.

Meanwhile, a sound recorded by the microphones 11 includes so-called noise, such as ambient noise, in addition to uttered voices. The relationship of distances between a sound source of noise and the microphones 11 resembles that for the voice uttered by the other person. When a distance between a sound source "c" of noise and the first microphone 11a and a distance between the sound source "c" and the second microphone 11b are denoted as Lc1 and Lc2, respectively, the distance Lc1 is close to the distance Lc2 according to the examples illustrated in FIGS. 4 and 5. Accordingly, a sound pressure ratio Gc2/Gc1 in the sound recorded by the microphones 11 is smaller than the threshold α="2". However, such noise is separated from uttered voices by performing filtering processing using existing techniques, such as a band-pass filter and a gain filter.

The description has been given for the speaker discrimination process according to this exemplary embodiment in which the information of the sound recorded by the first microphone 11a and the information of the sound recorded by the second microphone 11b are used. The speaker may be similarly discriminated even when the information of the sound recorded by the third microphone 11c is used instead of the information of the sound recorded by the second microphone 11b in the above process.

Next, a description will be given for a method for detecting a posture (orientation of the face) of a speaker (wearer) according to this exemplary embodiment.

When it is determined that the speaker is the wearer of the terminal apparatus 10 as a result of the forgoing speaker discrimination process, the audio analysis system according to this exemplary embodiment detects the orientation of the face of the speaker (wearer) as the posture of the speaker. That is, a direction toward which the mouth of the speaker (wearer) is directed is detected in this exemplary embodiment. As in the foregoing speaker recognition process, nonverbal information such as sound pressure is used in order to detect the posture of the speaker in this exemplary embodiment, instead of verbal information obtained by using morphological analysis and dictionary information.

As described with reference to FIGS. 1 and 2, the second microphone 11b and the third microphone 11c of the terminal apparatus 10 are arranged at positions which are at substantially the same distance from the mouth of the wearer and are substantially symmetrical about the line that passes through the mouth of the wearer in a state where the wearer is facing the front. Accordingly, when the wearer makes an utterance facing the front, sound pressures of a sound recorded by the second and third microphones 11b and 11c are substantially the same.

In contrast, when the wearer makes an utterance with their face directed toward a direction which is shifted from the front of the wearer by a specific angle, the distance between the mouth of the wearer and the second microphone 11b greatly differs from the distance between the mouth of the wearer and the third microphone 11c. Accordingly, the sound pressure of the sound recorded by the second microphone 11b also greatly differs from the sound pressure of the sound recorded by the third microphone 11c.

Figure 6A:
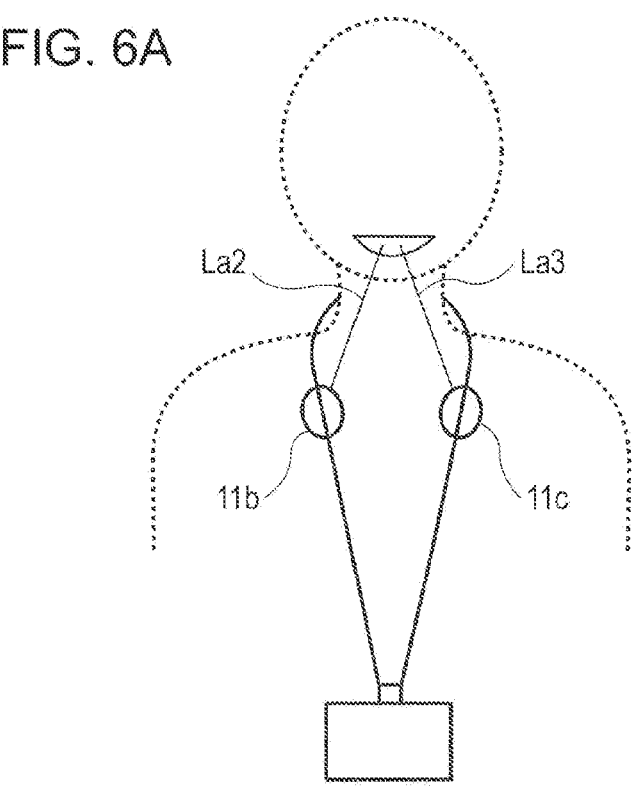
FIGS. 6A and 6B illustrate relationships among an orientation of the face of a wearer, a distance between the mouth of the wearer and a second microphone, and a distance between the mouth of the wearer and a third microphone.
Figure 6B:
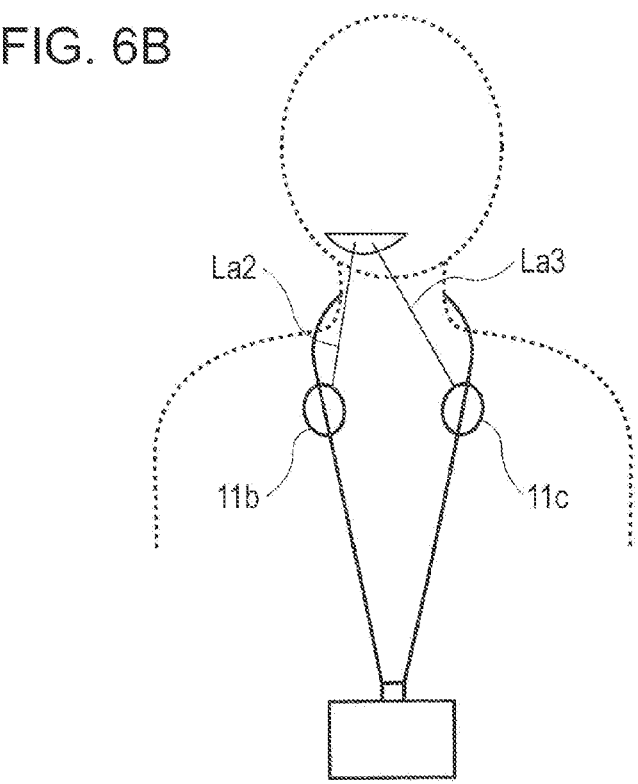

FIGS. 6A and 6B illustrate relationships among the orientation of the face of the wearer, the distance between the mouth of the wearer and the second microphone 11b, and the distance between the mouth of the wearer and the third microphone 11c.

As illustrated in FIG. 6A, when the wearer is facing the front, the distance La2 between the second microphone 11b and the mouth of the wearer serving as the sound source "a" and a distance La3 between the third microphone 11c and the mouth of the wearer serving as the sound source "a" satisfy a relation $$La2 \approx La3.$$

In contrast, when the wearer makes an utterance facing toward the right (the side where the second microphone 11b is arranged) as illustrated in FIG. 6B, for example, the relation between the distance La2 and the distance La3 is denoted as $$La3 > La2.$$

Accordingly, in the case illustrated in FIG. 6B, the relation between the sound pressure Ga2 at the second microphone 11b and a sound pressure Ga3 at the third microphone 11c is denoted as $$Ga2 > Ga3.$$

Accordingly, the difference between the sound pressure Ga2 at the second microphone 11b and the sound pressure Ga3 at the third microphone 11c is determined in this exemplary embodiment. If the difference exceeds a preset threshold p, it is determined that the speaker (wearer) is facing toward the side (right or left) where the microphone 11 having the greater sound pressure is arranged. Specifically, when $$Ga2 - Ga3 > \beta$$

is satisfied, it is determined that the face of the speaker is directed toward the side where the second microphone 11b is arranged. In contrast, when $$Ga3 - Ga2 > \beta$$

is satisfied, it is determined that the face of speaker is directed toward the side where the third microphone 11c is arranged.

Meanwhile, when the sound pressure Ga2 at the second microphone 11b and the sound pressure Ga3 at the third microphone 11c are referred to in order to determine the orientation of the face of the speaker, the relationship between the magnitudes of the sound pressures Ga2 and Ga3 may be simply referred to. Specifically, when $$Ga2 > Ga3$$

or $$Ga3 > Ga2$$

is satisfied, it may be determined that the speaker is facing toward the side where the microphone 11 having the greater sound pressure is arranged. However, in the above example, the difference between the sound pressures is compared with the threshold β in consideration of a case where sound pressures may contain errors caused by the influence of an utterance environment, such as noise and echo of uttered voices.

FIG. 7 is a flowchart illustrating an operation of the terminal apparatus 10 in this exemplary embodiment.

As illustrated in FIG. 7, once the microphones 11 of the terminal apparatus 10 acquire a sound, electric signals (audio signals) corresponding to the acquired sound are sent to the first to third amplifiers 13a to 13c from the corresponding microphones 11 (step S601). Upon acquiring the audio signals from the corresponding microphones 11, the first to third amplifiers 13a to 13c amplify the signals, and send the amplified signals to the audio signal analysis unit 15 (step S602).

The audio signal analysis unit 15 performs filtering processing on the signals amplified by the first to third amplifiers 13a to 13c so as to remove noise components, such as ambient noise, from the signals (step S603). The audio signal analysis unit 15 then determines an average sound pressure of the sound recoded by each microphone 11 at predetermined intervals (e.g., several tenths of a second to several hundredths of a second) from the noise-component removed signal (step S604).

When a gain exists in the average sound pressure for each microphone 11, which have been determined in step S604, (YES in step S605), the audio signal analysis unit 15 determines that an uttered voice is present (utterance is performed), and determines a ratio (sound pressure ratio) of the average sound pressure at the second microphone 11b to the average sound pressure at the first microphone 11a (step S606). If the sound pressure ratio determined in step S606 is greater than or equal to the threshold α (YES in step S607), the audio signal analysis unit 15 determines that the voice is uttered by the wearer (step S608). If the sound pressure ratio determined in step S606 is smaller than the threshold α (NO in step S607), the audio signal analysis unit 15 determines that the voice is uttered by another person (step S609).

On the other hand, when no gain exists in the average sound pressure at each microphone 11, which have been determined in step S604, (NO in step S605), the audio signal analysis unit 15 determines that an uttered voice is absent (utterance is not performed) (step S610). Meanwhile, it may be determined that the gain exists when the value of the gain of the average sound pressure is greater than or equal to a predetermined value in consideration of a case where noise that has not been removed by the filtering processing performed in step S603 may still remain in the signal.

When it is determined that the voice is uttered by the wearer in step S608, the audio signal analysis unit 15 then determines a difference (sound pressure difference) between the average sound pressure at the second microphone 11b and the average sound pressure at the third microphone 11c. If the determined sound pressure difference is greater than a threshold β (YES in step S611), the audio signal analysis unit 15 identifies the orientation of the face of the speaker (wearer) in accordance with the relationship between magnitudes of the sound pressures (step S612). On the other hand, if the determined sound pressure difference is not greater than the threshold β (NO in step S611), the audio signal analysis unit 15 does not identify the orientation of the face of the speaker. Meanwhile, in the case that the orientation of the face of the speaker is not identified, handling of information regarding the orientation of the face of the speaker may be set in accordance with system specifications or the like. For example, the information regarding the orientation of the face of the speaker may be omitted or it may be assumed that the speaker is facing the front when the orientation of the face of the speaker is not identifiable on the basis of the sound pressures.

Subsequently, the audio signal analysis unit 15 transmits, as an analysis result, the information obtained in the processing of steps S604 to S612 (the presence or absence of the utterance, information on the speaker, the information on the orientation of the face of the speaker) to the host apparatus 20 via the data transmission unit 16 (step S613). At this time, duration of an utterance of each speaker (the wearer or the other person), the value of the gain of the average sound pressure, and other additional information may be transmitted to the host apparatus 20 together with the analysis result.

Meanwhile, in this exemplary embodiment, whether a voice is uttered by the wearer or by the other person is determined by comparing the sound pressure at the first microphone 11a with the sound pressure at the second microphone 11b. However, the speaker discrimination according to this exemplary embodiment is not limited to the discrimination based on comparison of sound pressures as long as the discrimination is performed on the basis of nonverbal information that is extracted from the audio signals acquired by the microphones 11. For example, the audio acquisition time (output time of an audio signal) at the first microphone 11a may be compared with the audio acquisition time at the second microphone 11b. In this case, a certain degree of difference (time difference) occurs between the audio acquisition times regarding a voice uttered by the wearer since the difference between the distance between the mouth of the wearer and the first microphone 11a and the distance between the mouth of the wearer and the second microphone 11b is large. On the other hand, the time difference between the audio acquisition times of a voice uttered by the other person is smaller than that for the voice uttered by the wearer since the difference between the distance between the mouth of the other person and the first microphone 11a and the distance between the mouth of the other person and the second microphone 11b is small. Accordingly, a threshold may be set for the time difference between the audio acquisition times. If the time difference between the audio acquisition times is greater than or equal to the threshold, it may be determined that the voice is uttered by the wearer. If the time difference between the audio acquisition times is smaller than the threshold, it may be determined that the voice is uttered by the other person.

Similarly, in this exemplary embodiment, the orientation of the face of the speaker (wearer) is identified by comparing the sound pressure at the second microphone 11b with the sound pressure at the third microphone 11c. However, the detection of the orientation of the face of the speaker according to this exemplary embodiment is not limited to the detection based on comparison of sound pressures as long as the detection is performed on the basis of nonverbal information that is extracted from the audio signals acquired by the microphones 11. For example, the audio acquisition time (output time of the audio signal) at the second microphone 11b may be compared with the audio acquisition time at the third microphone 11c. In this case, the audio acquisition time at the second microphone 11b is substantially equal to the audio acquisition time at the third microphone 11c if the speaker is facing the front. On the other hand, if the speaker makes an utterance facing in a direction that is shifted from the front by a certain angle, the audio acquisition time at the microphone 11 (e.g., the second microphone 11b) arranged in the direction toward which the face of the speaker is directed is earlier than the audio acquisition time at the microphone 11 (e.g., the third microphone 11c) arranged on the opposite side. Accordingly, a threshold may be set for the time difference between the audio acquisition times. If the time difference between the audio acquisition times is greater than the threshold, it may be determined that the face of the speaker is directed toward the side where the microphone 11 having the earlier audio acquisition time is arranged.

Furthermore, in the operation example described above, the orientation of the face of the speaker (wearer) is identified (detected) after it is determined that the speaker is the wearer. However, whether the speaker is the wearer or the other person may be discriminated after the orientation of the face of the speaker is identified on the basis of the sound pressures at the second and third microphones 11b and 11c. In the latter case, if the speaker is the other person, the detection result regarding the orientation of the face of the speaker may be discarded as invalid information or may be used as information for identifying the position of the other person against the wearer.

Additionally, in the operation example described above, the speaker (whether the speaker is the wearer or the other person) is discriminated by comparing the sound pressures at the first and second microphones 11a and 11b. However, the discrimination may be made by comparing the sound pressures at the first and third microphones 11a and 11c instead of the sound pressures at the first and second microphones 11a and 11b.

Expansion of the terminal apparatus 10 will be described. In the above exemplary configuration, the horizontal orientation (right or left) of the face of the speaker (wearer) is detected on the basis of the audio signals acquired by the second and third microphones 11b and 11c. In the audio analysis system according to this exemplary embodiment, a microphone 11 is additionally included in the terminal apparatus 10 and the vertical orientation (up or down) of the face of the speaker (wearer) is detected in addition to the horizontal orientation.

Figure 8A:
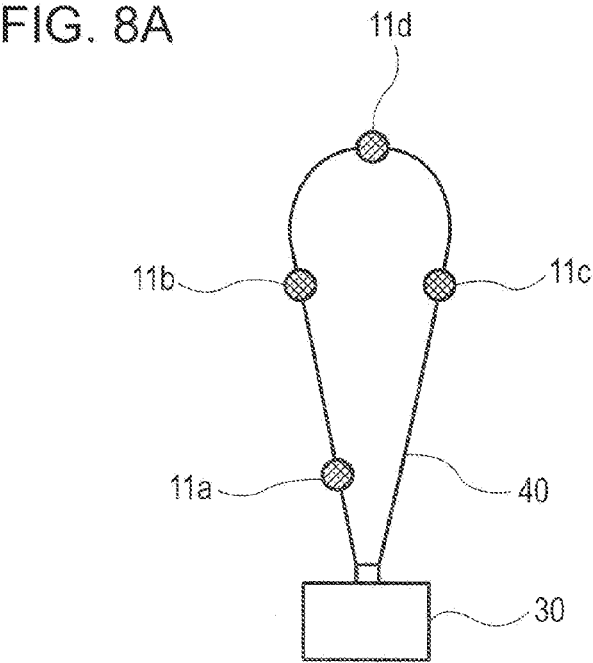
FIGS. 8A and 8B illustrate an example of a configuration of the terminal apparatus for detecting the vertical orientation (up or down) of the face of a speaker (wearer)
Figure 8B:
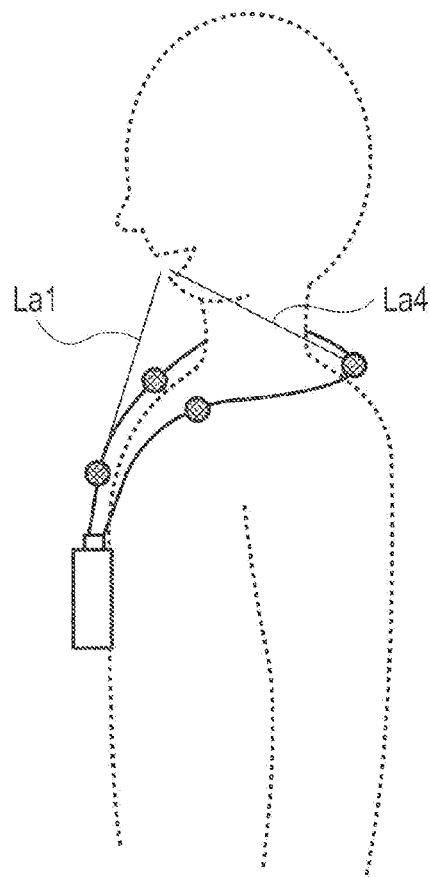

FIGS. 8A and 8B illustrate an example of a configuration of the terminal apparatus 10 for detecting the vertical orientation (up or down) of the face of the speaker (wearer).

As illustrated in FIG. 8A, the terminal apparatus 10 according to this configuration example includes four microphones 11. Since the first microphone 11a, the second microphone 11b, and the third microphone 11c among the four microphones 11 have the similar configurations as those described with reference to FIGS. 1 and 2, the description thereof will be omitted by assigning the same references thereto.

A fourth microphone 11d is a non-directional microphone like the first microphone 11a, the second microphone 11b, and the third microphone 11c. The fourth microphone 11d is disposed at substantially the farthest position from the connection part of the strap 40 that is connected to the main body 30. In this way, the fourth microphone 11d is arranged behind (on the back side of) the neck of the wearer in a state where the wearer wears the strap 40 around their neck to hang the main body 30 from their neck.

Although not illustrated, the terminal apparatus 10 also includes a fourth amplifier that amplifies an electric signal (audio signal) output from the fourth microphone 11d. This fourth amplifier has a configuration similar to those of the first to third amplifiers 13a to 13c illustrated in FIG. 1. The audio signal amplified by the fourth amplifier is sent to the audio signal analysis unit 15.

As illustrated in FIG. 8B, in this configuration example, the first microphone 11a and the fourth microphone 11d are arranged at substantially the same distance from the mouth of the wearer in a state where the wearer is facing the front. Specifically, when the first microphone 11a is included in the strap 40, the first microphone 11a is disposed at a position where the above-described positional relationship with the fourth microphone 11d is satisfied. Additionally, when the first microphone 11a is included in the main body 30, the length of the strap 40 is adjusted so that the above-described positional relationship is satisfied between the first microphone 11a and the fourth microphone 11d.

With such a configuration, when the wearer turns their face down, a relation $$La4 > La1$$

is satisfied, where La1 denotes the distance between the sound source "a", i.e., the mouth of the wearer, and the first microphone 11a and La4 denotes the distance between the sound source "a" and the fourth microphone 11d. Accordingly, a relation between the sound pressure Ga1 at the first microphone 11a and a sound pressure Ga4 at the fourth microphone 11d is denoted as $$Ga1 > Ga4.$$

In contrast, when the wearer turns their face up, a relation $$La1 > La4,$$

is satisfied. Accordingly, the relation between the sound pressures Ga1 and Ga4 is denoted as $$Ga4 > Ga1.$$

Thus, as in the detection of the horizontal orientation (left or right) of the face of the wearer, a difference between the sound pressure Ga1 and the sound pressure Ga4 is determined. If the difference exceeds a preset threshold y, it is determined that the wearer is facing toward a direction (up or down) that corresponds to the greater sound pressure. Meanwhile, as in the detection of the horizontal orientation (left or right) of the face of the wearer, simply a relationship between magnitudes of the sound pressures Ga1 and Ga4 may be referred to also in this case instead of using the threshold. As in the detection of the horizontal orientation (left or right) of the face of the wearer, the orientation (up or down) of the face of the wearer may be determined by comparing the audio acquisition time at the first microphone 11a with the audio acquisition time at the fourth microphone 11d instead of the sound pressures.

In the above configuration, the positional relationship between the first microphone 11a and the fourth microphone 11d is set so that La1≈La4 is satisfied (La1 is substantially equal to La4) in a state where the wearer is facing the front. However, at least the relation that the difference between the sound pressure Ga1 at the first microphone 11a and the sound pressure Ga4 at the fourth microphone 11d is smaller than the threshold γ (or the relation Ga1≈Ga4) is satisfied regarding a voice uttered by the wearer facing the front in an initial state in the terminal apparatus 10 according to this exemplary embodiment. Thus, the length of the strap 40 may be adjusted so that the sound pressure Ga1 at the first microphone 11a and the sound pressure Ga4 at the fourth microphone 11d satisfy the foregoing relationship when the wearer wears the terminal apparatus 10.

The microphone 11 is worn using the strap 40. The strap 40 used with the terminal apparatus 10 according to this exemplary embodiment and a structure for mounting the microphones 11 in the strap 40 will be further described.

As described with reference to FIGS. 6A and 6B, in this exemplary embodiment, the orientation of the face of the wearer is detected by using the fact that sound pressures are substantially the same at the microphones 11 which are at substantially the same distance from the mouth of the wearer. However, orientations of the microphones 11 may differ from one another when the wearer wears the terminal apparatus 10 because the tubular strap 40 may get twisted, for example. For example, one microphone 11 may be directed toward the front (a direction opposite to a direction in which the microphone 11 is in contact with the body of the wearer), whereas the other microphone 11 may be directed toward the back (the direction in which the microphone 11 is in contact with the body of the wearer). In such a case, the orientations of the microphones 11 affect sound pressures. Specifically, even when the two microphones 11 are located at substantially the same distance from the mouth of the wearer, sound pressures at the microphones 11 may differ. Accordingly, a configuration is adoptable which reduces the influence of the orientations of the microphones 11 on the sound pressures.

Figure 9:
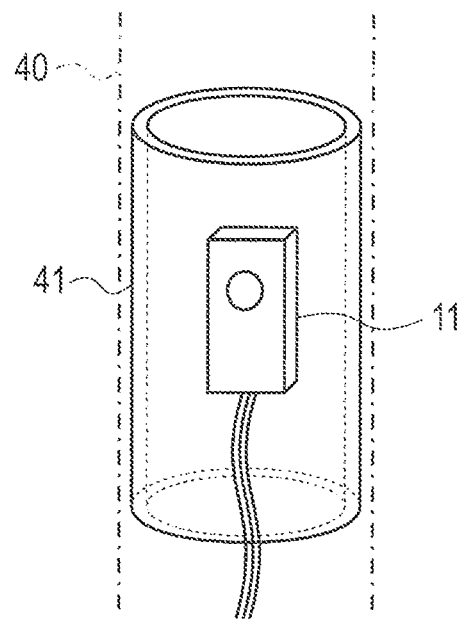
FIG. 9 illustrates an example of a structure for mounting a microphone in a strap.

FIG. 9 illustrates an example of a structure for mounting the microphone 11 in the strap 40.

In the example illustrated in FIG. 9, the microphone 11 which is contained in a short tubular casing 41 is mounted in the strap 40. With such a configuration, a sound is input to the microphone 11 via holes at respective ends of the casing 41. Accordingly, the orientation of the microphone 11 inside the casing 41 hardly affects the sound pressure.

In addition to this configuration, the strap 40 may have a wide belt-like shape. The strap 40 having the belt-like shape is less likely to get twisted, and thus, the orientations of the microphones 11 mounted in the strap 40 are more likely to be uniform. Accordingly, the difference between the orientations of the microphones 11 is less likely to affect the sound pressures. Additionally, by using a material having certain hardness, such as leather or metal, as the material of the strap 40, the strap 40 is further less likely to be twisted.

An application example of the audio analysis system and functions of the host apparatus 20 will be described. In the audio analysis system according to this exemplary embodiment, information on utterances (utterance information) which has been acquired by the plural terminal apparatuses 10 in the above manner is gathered in the host apparatus 20. The host apparatus 20 performs various analysis processes using the information acquired from the plural terminal apparatuses 10, in accordance with the usage and application of the audio analysis system. An example will be described below in which this exemplary embodiment is used as a system for acquiring information regarding communication between plural wearers.

Figure 10:
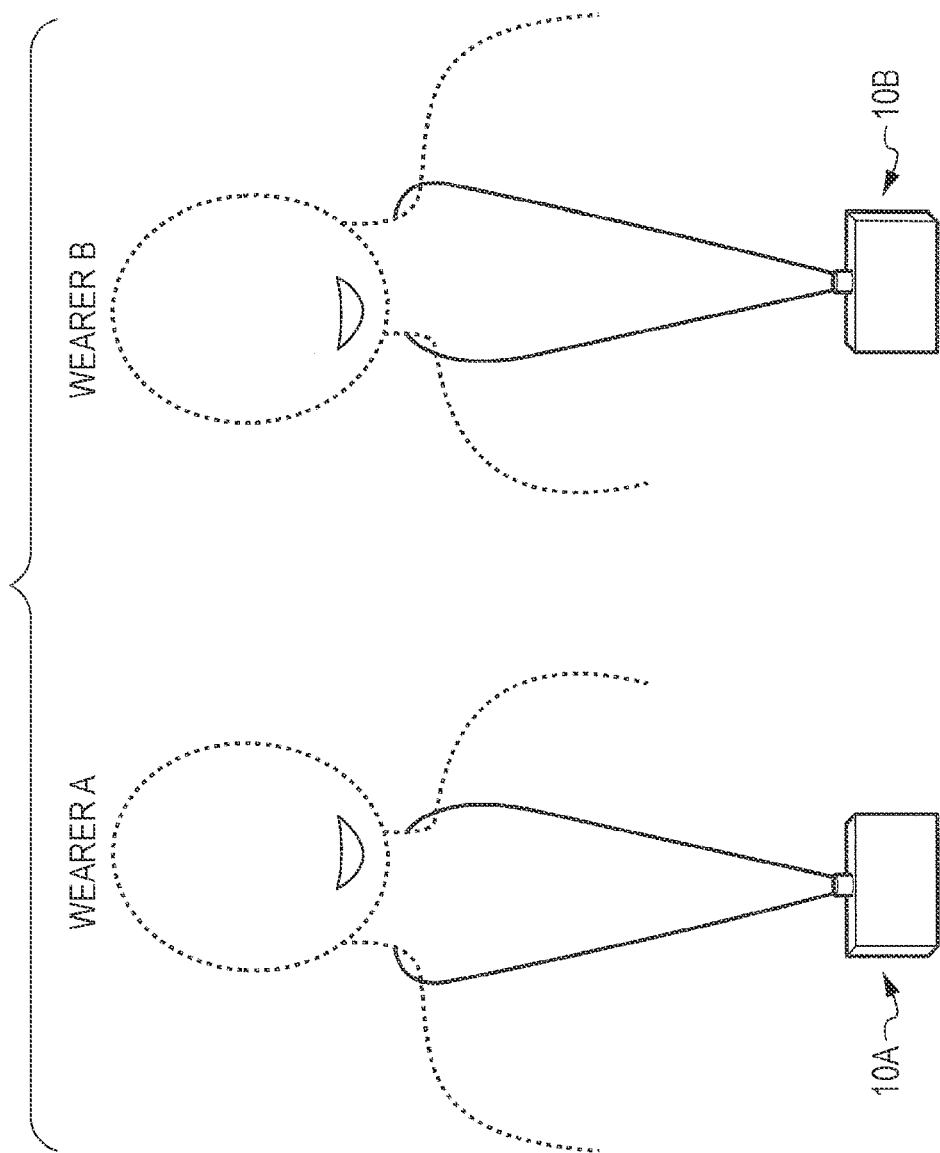
FIG. 10 illustrates a state where plural wearers each wearing the terminal apparatus of the exemplary embodiment are having a conversation.
Figure 11:
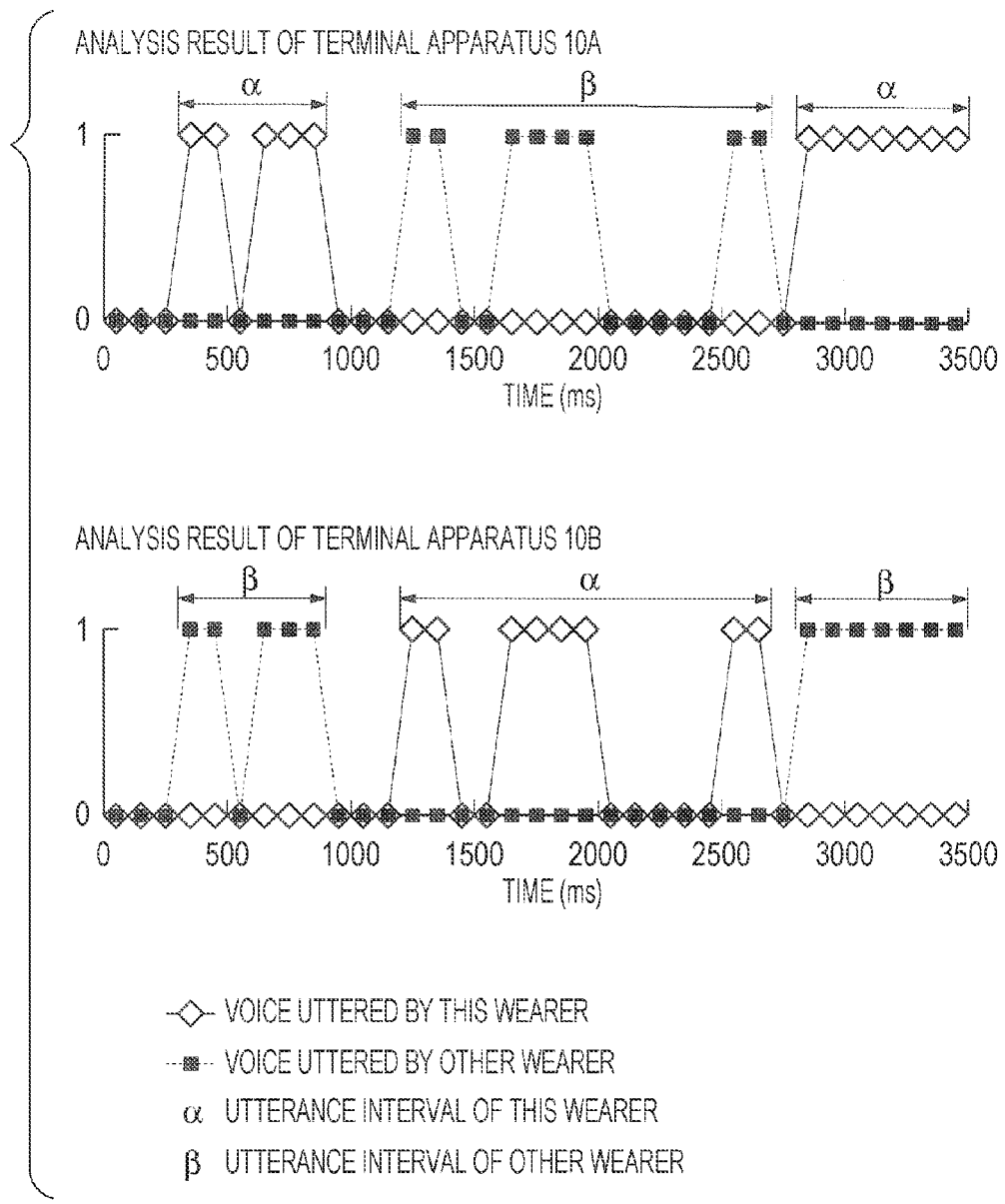
FIG. 11 illustrates an example of utterance information of each terminal apparatus obtained in the state of the conversation illustrated in FIG. 10.

FIG. 10 illustrates a state where plural wearers each wearing the terminal apparatus 10 according to this exemplary embodiment are having a conversation. FIG. 11 illustrates an example of utterance information of each of terminal apparatuses 10A and 10B obtained in the state of the conversation illustrated in FIG. 10.

As illustrated in FIG. 10, a case will be discussed where two wearers A and B each wearing the terminal apparatus 10 are having a conversation. In this case, a voice recognized as an utterance of the wearer by the terminal apparatus 10A of the wearer A is recognized as an utterance of another person by the terminal apparatus 10B of the wearer B. In contrast, a voice recognized as an utterance of the wearer by the terminal apparatus 10B is recognized as an utterance of another person by the terminal apparatus 10A.

The terminal apparatuses 10A and 10B separately transmit utterance information to the host apparatus 20. The utterance information acquired from the terminal apparatus 10A and the utterance information acquired from the terminal apparatus 10B have opposite speaker (the wearer and the other person) discrimination results but have resembling utterance state information, such as duration of each utterance and timings at which the speaker is switched. Accordingly, the host apparatus 20 in this application example compares the information acquired from the terminal apparatus 10A with the information acquired from the terminal apparatus 10B, thereby determining that these pieces of information indicate the same utterance state and recognizing that the wearers A and B are having a conversation. Here, the utterance state information includes at least utterance-related time information, such as duration of each utterance of each speaker, start and end times of each utterance, and a time (timing) at which the speaker is switched. Additionally, part of the utterance-related time information may be used or other information may be additionally used in order to determine the utterance state of a specific conversation.

Figure 12:
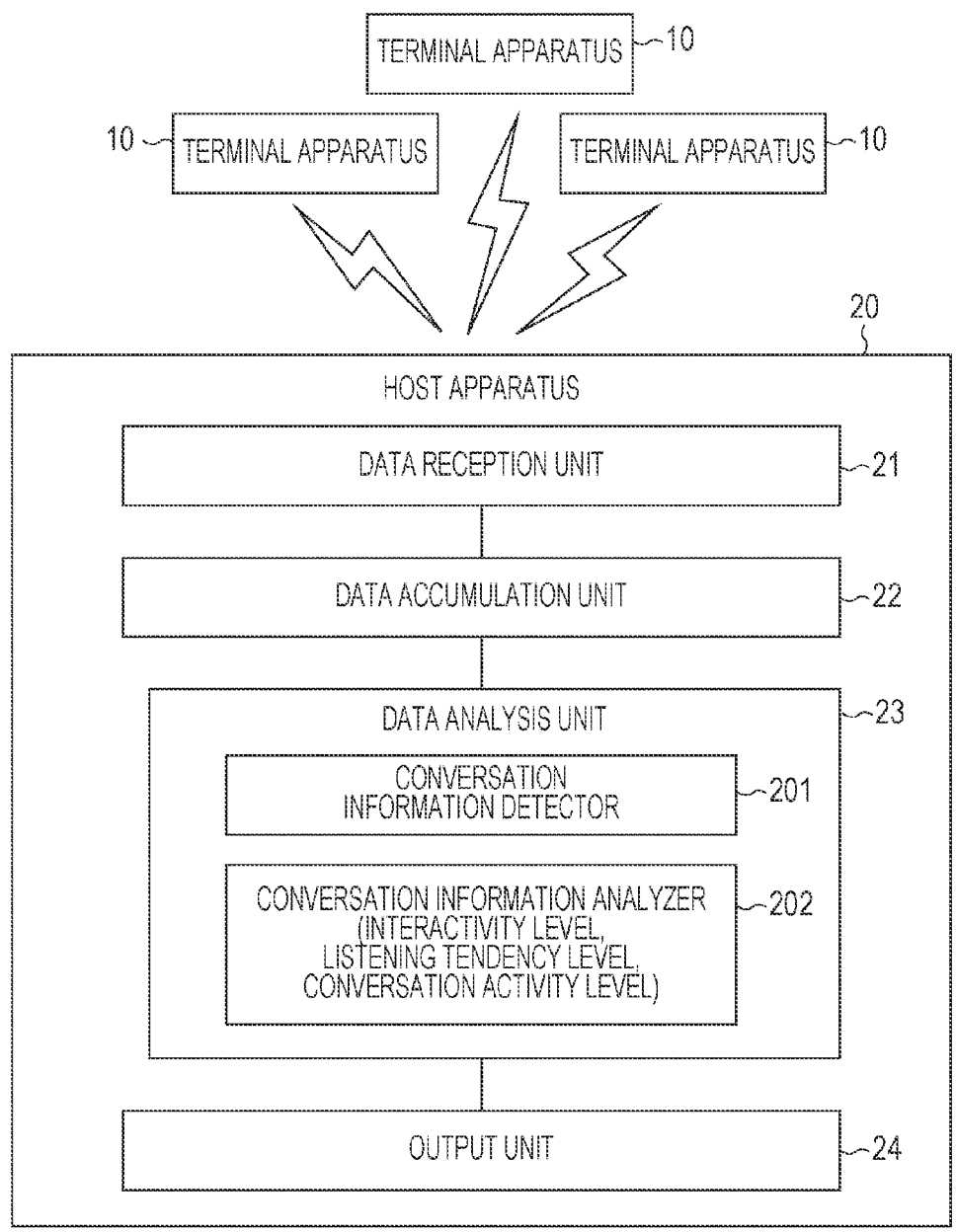
FIG. 12 illustrates an example of a functional configuration of a host apparatus in the exemplary embodiment.

FIG. 12 illustrates an example of a functional configuration of the host apparatus 20 in this application example.

In this application example, the host apparatus 20 includes a conversation information detector 201 that detects utterance information (hereinafter, referred to as conversation information) acquired from the terminal apparatuses 10 of wearers who are having a conversation, from among pieces of utterance information acquired from the other terminal apparatuses 10, and a conversation information analyzer 202 that analyzes the detected conversation information. The conversation information detector 201 and the conversation information analyzer 202 are implemented as functions of the data analysis unit 23.

Utterance information is also transmitted to the host apparatus 20 from the terminal apparatuses 10 other than the terminal apparatuses 10A and 10B. The utterance information that has been received by the data reception unit 21 from each terminal apparatus 10 is accumulated in the data accumulation unit 22. The conversation information detector 201 of the data analysis unit 23 then reads out the utterance information of each terminal apparatus 10 accumulated in the data accumulation unit 22, and detects conversation information, which is utterance information regarding a specific conversation.

As illustrated in FIG. 11, a characteristic correspondence different from that of the utterance information of the other terminal apparatuses 10 is extracted from the utterance information of the terminal apparatus 10A and the utterance information of the terminal apparatus 10B. The conversation information detector 201 compares the utterance information that has been acquired from each terminal apparatus 10 and accumulated in the data accumulation unit 22, detects pieces of utterance information having the foregoing correspondence from among the pieces of utterance information acquired from the plural terminal apparatuses 10, and identifies the detected pieces of utterance information as conversation information regarding the same conversation. Since utterance information is transmitted to the host apparatus 20 from the plural terminal apparatuses 10 at any time, the conversation information detector 201, for example, sequentially divides the utterance information into portions of a predetermined period and performs the aforementioned process, thereby determining whether or not conversation information regarding a specific conversation is included.

The condition used by the conversation information detector 201 to detect conversation information regarding a specific conversation from pieces of utterance information of the plural terminal apparatuses 10 is not limited to the aforementioned correspondence illustrated in FIG. 11. The conversation information may be detected using any methods that allow the conversation information detector 201 to identify conversation information regarding a specific conversation from among pieces of utterance information.

Although the example is presented above in which two wearers each wearing the terminal apparatus 10 are having a conversation, the number of conversation participants is not limited to two. When three or more wearers are having a conversation, the terminal apparatus 10 worn by each wearer recognizes a voice uttered by the wearer of this terminal apparatus 10 as an uttered voice of the wearer, and discriminates this voice from voices uttered by (two or more) other people. However, the utterance state information, such as duration of each utterance and timings at which the speaker is switched, resembles between the pieces of information obtained by the terminal apparatuses 10. Accordingly, as in the aforementioned case for a conversation between two people, the conversation information detector 201 detects utterance information acquired from the terminal apparatuses 10 of the wearers who are participating in the same conversation, and discriminates this information from the utterance information acquired from the terminal apparatuses 10 of the wearers who are not participating in the conversation.

Thereafter, the conversation information analyzer 202 analyzes the conversation information that has been detected by the conversation information detector 201, and extracts features of the conversation. Specifically, in this exemplary embodiment, features of the conversation are extracted using three evaluation criteria, i.e., an interactivity level, a listening tendency level, and a conversation activity level. Here, the interactivity level represents a balance regarding frequencies of utterances of the conversation participants. The listening tendency level represents a degree at which each conversation participant listens to utterances of the other people. The conversation activity level represents a density of utterances in the conversation.

The interactivity level is identified by the number of times the speaker is switched during the conversation and a variance in times spent until a speaker is switch to another speaker (time over which one speaker continuously performs an utterance). This level is obtained on the basis of the number of times the speaker is switched and the time of the switching, from conversation information for a predetermined time. The more the number of times the speaker is switched and the smaller the variance in times spent until a speaker is switched to another speaker, the greater the value of the interactivity level. This evaluation criterion is common in all conversation information regarding the same conversation (utterance information of each terminal apparatus 10).

The listening tendency level is identified by a ratio of utterance duration of each conversation participant to utterance duration of the other participants in the conversation information. For example, regarding the following equation, it is assumed that the greater the calculated value, the greater the listening tendency level.

Listening tendency level=(Utterance duration of other people)÷(Utterance duration of wearer)

This evaluation criterion differs for each utterance information acquired from the corresponding terminal apparatus 10 of each conversation participant even when the conversation information is regarding the same conversation.

The conversation activity level is an index representing livelyness of the conversation, and is identified by a ratio of a silent period (a time during which no conversation participant speaks) to the whole conversation information. The shorter the sum of silent periods, the more frequently any of the conversation participants speaks in the conversation and the greater the value of the conversation activity level. This evaluation criterion is common in all conversation information (utterance information of each terminal apparatus 10) regarding the same conversation.

The conversation information analyzer 202 analyzes the conversation information in the aforementioned manner, thereby extracting features of the conversation from the conversation information. Additionally, the attitude of each participant toward the conversation is also identified from the aforementioned analysis. Meanwhile, the foregoing evaluation criteria are merely examples of information representing the features of the conversation, and evaluation criteria according to the usage and application of the audio analysis system according to this exemplary embodiment may be set by adopting other evaluation items or weighting each evaluation item.

By performing the foregoing analysis on various pieces of conversation information that have been detected by the conversation information detector 201 from among pieces of utterance information accumulated in the data accumulation unit 22, a communication tendency of a group of wearers of the terminal apparatuses 10 may be analyzed. Specifically, for example, by examining a correlation between the frequency of conversations and values, such as the number of conversation participants, duration of a conversation, the interactivity level, and the conversation activity level, the type of conversation that tends to be performed among the group of wearers is determined.

Additionally, by performing the foregoing analysis on pieces of conversation information of a specific wearer, a communication tendency of the wearer may be analyzed. An attitude of a specific wearer toward a conversation may have a certain tendency depending on conditions, such as partners of the conversation and the number of conversation participants. Accordingly, by examining pieces of conversation information of a specific wearer, it is expected that features, such as that the interactivity level is high in a conversation with a specific partner and that the listening tendency level increases in proportion to the number of conversation participants, are detected.

Meanwhile, the utterance information discrimination process and the conversation information analysis process described above merely indicate application examples of the audio analysis system according to this exemplary embodiment, and do not limit the usage and application of the audio analysis system according to this exemplary embodiment, functions of the host apparatus 20, and so forth. A processing function for performing various analysis and examination processes on utterance information acquired with the terminal apparatus 10 according to this exemplary embodiment may be implemented as a function of the host apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An audio analysis apparatus comprising:
 a main body;
 a strap that has an end portion to be connected to the main body and is to be used in order to hang the main body from the neck of a user;
 a first audio acquisition device that is at the end portion of the strap or in the main body;
 a second audio acquisition device that is at a position which is separate from the end portion by a first predetermined distance and which is on one side of the strap that extends from the neck of the user;
 a third audio acquisition device that is at another position which is separate from the end portion by a second predetermined distance and which is on the other side of the strap that extends from the neck of the user, the second predetermined distance being substantially equal to the first predetermined distance;
 an analysis unit that is in the main body, and that performs an analysis process to discriminate whether a sound acquired by the first audio acquisition device and the second or third audio acquisition device is an uttered voice of the user who is wearing the strap around the neck or an uttered voice of another person on the basis of a result of comparing a first audio signal of the sound acquired by the first audio acquisition device with a second audio signal of the sound acquired by the second audio acquisition device or a third audio signal of the sound acquired by the third audio acquisition device, and to detect an orientation of the face of the user who is wearing the strap around the neck on the basis of a result of comparing the second audio signal with the third audio signal; and
 a transmission unit that is in the main body and that transmits an analysis result obtained by the analysis unit to an external apparatus.

2. The audio analysis apparatus according to claim 1, wherein:
 the strap has a tubular structure; and
 at least the second and third audio acquisition devices are disposed inside the strap.

3. The audio analysis apparatus according to claim 1, wherein:
 the analysis unit
  compares a sound pressure ratio with a threshold, the sound pressure ratio being a ratio of a second sound pressure of the sound acquired by the second audio acquisition device or a third sound pressure of the sound acquired by the third audio acquisition device to a first sound pressure of the sound acquired by the first audio acquisition device,
  determines that the acquired sound is an uttered voice of the user when the sound pressure ratio is greater than or equal to the threshold, and
  determines that the acquired sound is an uttered voice of the other person when the sound pressure ratio is smaller than the threshold; and
 the analysis unit
  compares the second sound pressure with the third sound pressure, and
  determines that the face of the user is directed toward a direction where the mouth of the user is closer to one of the second and third audio acquisition devices that has the greater sound pressure.

4. The audio analysis apparatus according to claim 1, further comprising:
 a fourth audio acquisition device that is at substantially the farthest position from the end portion in the strap,
 wherein the analysis unit detects an orientation of the face of the user who is wearing the first and fourth audio acquisition devices on the basis of a result of comparing the first audio signal with a fourth audio signal of the sound acquired by the fourth audio acquisition device.

5. The audio analysis apparatus according to claim 4, wherein:

the strap has a length that satisfies a condition that a difference between the first sound pressure and a fourth sound pressure of the sound acquired by the fourth audio acquisition device is within a specific range in a case that the sound is a voice uttered by the user facing the front; and the analysis unit compares the first sound pressure with the fourth sound pressure, and determines that the face of the user is directed toward a direction where the mouth of the user is closer to one of the first and fourth audio acquisition devices that has the greater sound pressure.

6. An audio analysis apparatus comprising:

a first audio acquisition device that is to be worn by a user so as to be at a position where a distance of a sound wave propagation path between the first audio acquisition device and the mouth of the user is equal to a first distance in a state where the user is facing the front;

a second audio acquisition device that is to be worn by the user so as to be at a position where a distance of a sound wave propagation path between the second audio acquisition device and the mouth of the user is equal to a second distance in the state where the user is facing the front, the second distance being different from the first distance;

a third audio acquisition device that is to be worn by the user so that the mouth of the user, the second microphone, and the third microphone form a substantially isosceles triangle in which a side between the mouth of the user and the second microphone is substantially equal to a side between the mouth of the user and the third microphone in the state where the user is facing the front;

an analysis unit that performs an analysis process to discriminate whether a sound acquired by the first audio acquisition device and the second or third audio acquisition device is an uttered voice of the user who is wearing the first, second, and third audio acquisition devices or an uttered voice of another person other than the user on the basis of a result of comparing a first audio signal of the sound acquired by the first audio acquisition device with a second audio signal of the sound acquired by the second audio acquisition device or a third audio signal of the sound acquired by the third audio acquisition device, and to detect an orientation of the face of the user who is wearing the second and third audio acquisition devices on the basis of a result of comparing the second audio signal with the third audio signal; and a transmission unit that transmits an analysis result obtained by the analysis unit to an external apparatus.

7. The audio analysis apparatus according to claim 6, wherein:

the analysis unit compares a sound pressure ratio with a threshold, the sound pressure ratio being a ratio of a second sound pressure of the sound acquired by the second audio acquisition device or a third sound pressure of the sound acquired by the third audio acquisition device to a first sound pressure of the sound acquired by the first audio acquisition device, determines that the acquired sound is an uttered voice of the user when the sound pressure ratio is greater than or equal to the threshold, and determines that the acquired sound is an uttered voice of the other person when the sound pressure ratio is smaller than the threshold; and the analysis unit compares the second sound pressure with the third sound pressure, and determines that the face of the user is directed toward a direction where the mouth of the user is closer to one of the second and third audio acquisition devices that has the greater sound pressure.

8. The audio analysis apparatus according to claim 6, further comprising:

a fourth audio acquisition device that is to be worn by the user so as to be on the back side of the user, wherein the first audio acquisition device is worn so as to be on the front side of the user, and the analysis unit detects an orientation of the face of the user who is wearing the first and fourth audio acquisition devices on the basis of a result of comparing the first audio signal with a fourth audio signal of the sound acquired by the fourth audio acquisition device.

9. The audio analysis apparatus according to claim 8, wherein the analysis unit compares the first sound pressure with a fourth sound pressure of the sound acquired by the fourth audio acquisition device, and determines that the face of the user is directed toward a direction where the mouth of the user is closer to one of the first and fourth audio acquisition devices that has the greater sound pressure.

* * * * *